2,901,498
N-ALKYL, N-ALLYL THIOLCARBAMATE COMPOSITIONS

Harry Tilles, El Cerrito, and Joe Antognini, Mountain View, Calif., assignors to Stauffer Chemical Company, a corporation of Delaware No Drawing. Application January 11, 1957
Serial No. 633,551

6 Claims. (Cl. 260—455)

This invention relates to certain novel compositions of matter and the use of such compositions as herbicides. More particularly, it has been found that certain alkyl N-alkenyl, N-alkyl thiolcarbamates have valuable herbicidal properties and are particularly useful as pre-emergence herbicides.

Thus the compounds of the present invention have the following formula:

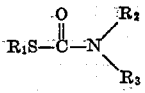

wherein $R_1$ and $R_2$ are lower alkyl radicals and $R_3$ is a lower alkenyl radical. Thus, the following non-limiting examples illustrate various radicals which can be employed:

| $R_1$ | $R_2$ | $R_3$ |
|---|---|---|
| $C_2H_5$ | $C_2H_5$ | $CH_2=CHCH_2$ |
| n-$C_3H_7$ | $C_2H_5$ | $CH_2=CHCH_2$ |
| n-$C_4H_9$ | $C_2H_5$ | $CH_2=CHCH_2$ |
| $C_2H_5$ | n-$C_3H_7$ | $CH_2=CHCH_2$ |
| n-$C_3H_7$ | n-$C_3H_7$ | $CH_2=CHCH_2$ |
| n-$C_4H_9$ | n-$C_3H_7$ | $CH_2=CHCH_2$ |
| $C_2H_5$ | n-$C_4H_9$ | $CH_2=CHCH_2$ |
| n-$C_3H_7$ | n-$C_4H_9$ | $CH_2=CHCH_2$ |
| n-$C_4H_9$ | n-$C_4H_9$ | $CH_2=CHCH_2$ |

The following non-limiting examples illustrate methods by which the compounds of the invention can be made. (Code numbers have been assigned to the various compounds and are used hereinafter):

*Example I—(R-2176)*

4.1 g. (0.103 mole) of sodium hydroxide was dissolved in 50 cc. of water and to this solution was added 9.0 g. (0.106 mole) of N-allylethylamine and 50 cc. of ethyl ether. The mixture was cooled in an ice bath to 5° C. and then 12.8 g. (0.103 mole) of ethyl chlorothiolformate was added slowly, keeping the temperature of the reaction mixture at 5-10° C. After completion of the addition, the ether solution was separated from the water phase and was washed with 1-50 cc. portion of dilute hydrochloric acid (3 cc. of concentrated hydrochloric acid diluted to 50 cc. with water) and 1-25 cc. portion of water. It was then dried over anhydrous magnesium sulfate, filtered, and the filtrate was concentrated on the steam bath with the aid of a current of air. There was obtained as a residue 16 g. (89.8% yield) of ethyl N-ethyl-N-allylthiolcarbamate, $n_D^{30}$ 1.4900.

*Example II—(R-2177)*

When the general procedure of Example I was repeated except that 9.0 g. (0.106 mole) of N-allylethylamine, 14.3 g. (0.103 mole) of n-propyl chlorothiolformate and 4.1 g. (0.103 mole) of sodium hydroxide were employed, there was obtained 16.2 g. (84.4% yield) of n-propyl-N-ethyl-N-allylthiolcarbamate, $n_D^{30}$ 1.4872.

*Example III—(R-2178)*

When the general procedure of Example I was repeated except that 9.0 g. (0.106 mole) of N-allylethylamine, 15.7 g. (0.103 mole of n-butyl chlorothiolformate and 4.1 g. (0.103 mole) of sodium hydroxide were employed, there was obtained 17.9 g. (86.4% yield) of n-butyl N-ethyl-N-allylthiolcarbamate, $n_D^{30}$ 1.4861.

*Example IV—(R-2181)*

When the general procedure of Example I was repeated except that 40.8 g. (0.412 mole) of N-allyl-n-propylamine, 49.8 g. (0.400 mole) of ethyl chlorothiolformate and 16.0 g. (0.400 mole) of sodium hydroxide were employed, there was obtained 74 g. of ethyl N-allyl-N-n-propylthiolcarbamate. This material was purified by fractional distillation through an 18" Podbielniak Heli-Grid Column and 61.3 g. (82% yield) of pure product, B.P. (30 mm.) 137–138° C., $n_D^{30}$ 1.4873, $d_4^{20}=0.981$.

*Example V—(R-2182)*

When the general procedure of Example I was repeated except that 10 g. (0.101 mole) of N-allyl-n-propylamine, 13.6 g. (0.098 mole) of n-propyl chlorothiolformate and 3.9 g. (0.098 mole) of sodium hydroxide were employed, there was obtained 17.3 g. (87.8% yield) of n-propyl N-allyl-N-n-propylthiolcarbamate, $n_D^{30}$ 1.4847.

*Example VI—(R-2183)*

When the general procedure of Example I was repeated except that 10 g. (0.101 mole) of N-allyl-n-propylamine, 15 g. (0.098 mole) of n-butyl chlorothiolformate and 3.9 g. (0.098 mole) of sodium hydroxide were employed, there was obtained 20.9 g. (99.1% yield) of n-butyl N-allyl-N-n-propylthiolcarbamate, $n_D^{30}$ 1.4825.

*Exampe VII—(R-2187)*

When the general procedure of Example I was repeated except that 11.6 g. (0.103 mole) of N-allyl-n-butylamine, 12.5 g. (0.100 mole) of ethyl chlorothiolformate and 4.0 g. (0.100 mole) of sodium hydroxide were employed, there was obtained 17.8 g. (88.5% yield) of ethyl N-allyl-N-n-butylthiolcarbamate, $n_D^{30}$ 1.4852.

*Example VIII—(R-2188)*

When the general procedure of Example I was repeated except that 11.6 g. (0.103 mole) of N-allyl-n-butylamine, 13.9 g. (0.100 mole) of n-propylchlorothiolformate and 4.0 g. (0.100 mole) of sodium hydroxide were employed, there was obtained 19.8 g. (92.1% yield) of n-propyl N-allyl-N-n-butylthiolcarbamate, $n_D^{30}$ 1.4832.

*Example IX—(R-2189)*

When the general procedure of Example I was repeated except that 11.6 g. (0.103 mole) of N-allyl-n-butylamine, 15.3 g. (0.100 mole) of n-butyl chlorothiolformate and 4.0 g. (0.100) mole) of sodium hydroxide were employed, there was obtained 22.0 g. (96.0% yield) of n-butyl N-allyl-N-n-butylthiolcarbamate, $n_D^{30}$ 1.4820.

The compounds of the present invention have been extensively tested as herbicides and have been particularly evaluated as pre-emergence herbicides. Pre-emergence herbicides are ordinarily used by placing a narrow band of the herbicide over the center of a seeded crop row at time of planting or before crop emerges. If the herbicide is harmless to the desired crop, seeds or seedlings, but phytotoxic to the weed seeds or seedlings most frequently encountered, the crop grows in an almost weed-free environment. Of course, the pre-emergence herbicide may be used over the entire field, but it is normally used in a narrow band which straddles the crop row and the balance of the weeds are controlled by various cultivation methods. Generally speaking, the herbicides of the present invention are selective toward annual grasses and broad-leafed plants, and so are effective against the most common weeds but have little effect on such valuable row crops as corn, peas and beans, although various specific compounds are selective in different ways as the following data show. The phytocidal composition may be applied to the soil in any convenient form. For instance, it can be dissolved in a solvent, such as acetone, or emulsified and sprayed onto the soil, or it can be combined with a dry inert carrier and applied as a dust or as granules; although the composition may be applied to an entire crop plot, it is generally preferred to apply it in a narrow band, say 6", over the seeded row of a newly planted crop. Generally, rates of application of from one-half to forty pounds per acre of actual area treated will be found suitable.

In one series of tests the seeds of various plants were planted in 3" diameter paper cans in Santa Cruz loam. The cans were watered and an amount of each compound was applied as an acetone solution to each can which would correspond to a rate of application of 10 or 40 pounds per acre of the actual compound under test. Similar controls were planted and all of the cans were maintained in a greenhouse, watered as needed, and the germination and growth of the treated cans were compared with the controls. Germination was reported on a scale of 0–100 and growth on a scale of 0–10; 100 and 10 represent, respectively, no deviation from the control. The following data were obtained:

We claim:
1. A new compound of the formula

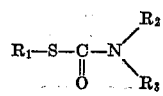

wherein $R_1$ and $R_2$ are lower alkyl radicals, and $R_3$ is allyl.

2. As a new compound n-propyl N-ethyl-N-allylthiolcarbamate.

3. As a new compound n-butyl N-ethyl-N-allylthiolcarbamate.

4. As a new compound ethyl N-allyl-N-n-propylthiolcarbamate.

5. As a new compound n-propyl N-allyl-N-n-propylthiolcarbamate.

6. As a new compound n-butyl N-allyl-N-n-propylthiolcarbamate.

References Cited in the file of this patent

UNITED STATES PATENTS

| | | |
|---|---|---|
| 2,060,733 | Hunt et al. | Nov. 10, 1936 |
| 2,160,880 | Loane et al. | June 6, 1939 |
| 2,562,011 | Baumgartner | July 24, 1951 |
| 2,608,575 | Mathes | Aug. 26, 1952 |
| 2,631,935 | Baumgartner | Mar. 17, 1953 |
| 2,642,451 | Weijlard | June 16, 1953 |
| 2,687,348 | Kosmin | Aug. 24, 1954 |
| 2,786,866 | Hook et al. | Mar. 26, 1957 |

| Compound | Rate/Acre, pounds | Peas | | Corn | | Radish | | Rye Grass | | Cucumbers | |
|---|---|---|---|---|---|---|---|---|---|---|---|
| | | Ge. | Gr. | Ge. | Gr. | Ge. | Gr. | Ge. | Gr. | Ge. | Gr. |
| R-2176 | 10 | 100 | 5 | 100 | 10 | 100 | 10 | 10 | 0+ | 10 | 4 |
| | 40 | 10 | 3 | 100 | 10 | 100 | 10 | 0 | | 0 | |
| R-2177 | 10 | 50 | 3 | 100 | 10 | 100 | 10 | 0 | | 10 | 2 |
| | 40 | 25 | 2 | 100 | 10 | 100 | 10 | 0 | | 0 | |
| R-2178 | 10 | 50 | 3 | 100 | 10 | 100 | 10 | 0 | | 10 | 1 |
| | 40 | 25 | 2 | 100 | 8 | 100 | 10 | 0 | | 0 | |
| R-2181 | 10 | 100 | 5 | 100 | 10 | 100 | 10 | 0 | | 25 | 3 |
| | 40 | 75 | 3 | 100 | 9 | 100 | 10 | 0 | | 0 | |
| H-2182 | 10 | 50 | 3 | 100 | 10 | 100 | 10 | 0 | | 0 | |
| | 40 | 15 | 1 | 100 | 9 | 100 | 10 | 0 | | 0 | |
| H-2183 | 10 | 100 | 4 | 100 | 10 | 100 | 10 | 0 | | 10 | 2 |
| | 40 | 15 | 1 | 100 | 10 | 100 | 10 | 0 | | 0 | |
| R-2187 | 10 | 100 | 5 | 100 | 10 | 100 | 10 | 0 | | 5 | 2 |
| | 40 | 100 | 4 | 100 | 8 | 100 | 10 | 0 | | 0 | |
| R-2188 | 10 | 100 | 5 | 100 | 10 | 103 | 10 | 10 | 0+ | 50 | 5 |
| | 40 | 75 | 2 | 100 | 9 | 100 | 10 | 0 | | 0 | |
| R-2189 | 10 | 100 | 5 | 100 | 10 | 100 | 10 | 25 | 0+ | 50 | 8 |
| | 40 | 100 | 4 | 100 | 8 | 100 | 10 | 0 | | 25 | 4 |

Ge.=percent germination.
Gr.=growth.